(12) United States Patent
Mooney et al.

(10) Patent No.: US 10,173,351 B2
(45) Date of Patent: Jan. 8, 2019

(54) CARPET EDGING AND METHOD OF APPLYING THE SAME

(71) Applicant: Aladdin Manufacturing Corporation, Calhoun, GA (US)

(72) Inventors: Kenneth Mooney, Calhoun, GA (US); David Sandiford, Calhoun, GA (US)

(73) Assignee: Aladdin Manufacturing Corporation, Calhoun, GA (US)

( * ) Notice: Subject to any disclaimer, the term of this patent is extended or adjusted under 35 U.S.C. 154(b) by 0 days.

(21) Appl. No.: 15/598,705

(22) Filed: May 18, 2017

(65) Prior Publication Data

US 2017/0334101 A1  Nov. 23, 2017

Related U.S. Application Data

(60) Provisional application No. 62/338,367, filed on May 18, 2016.

(51) Int. Cl.
| | |
|---|---|
| *A47G 27/00* | (2006.01) |
| *B29C 39/10* | (2006.01) |
| *B29C 39/38* | (2006.01) |
| *B29C 47/00* | (2006.01) |
| *B29L 31/00* | (2006.01) |
| *B29K 105/20* | (2006.01) |
| *A47G 27/02* | (2006.01) |
| *A47G 27/04* | (2006.01) |
| *B29C 67/00* | (2017.01) |

(52) U.S. Cl.
CPC .............. *B29C 39/10* (2013.01); *B29C 39/38* (2013.01); *B29C 47/0009* (2013.01); *A47G 27/0268* (2013.01); *A47G 27/045* (2013.01); *B29C 67/0044* (2013.01); *B29K 2105/20* (2013.01); *B29K 2713/00* (2013.01); *B29K 2995/0039* (2013.01); *B29L 2031/7322* (2013.01); *Y10T 428/16* (2015.01); *Y10T 428/163* (2015.01); *Y10T 428/164* (2015.01); *Y10T 428/19* (2015.01)

(58) Field of Classification Search
CPC . Y10T 428/16; Y10T 428/19; Y10T 428/163; Y10T 428/164; A47G 27/0268; A47G 27/0475; A47G 27/0481
USPC ................................................ 428/82, 88, 96
See application file for complete search history.

(56) References Cited

PUBLICATIONS

Karastan, Carpet Sample Board Edging End, May 17, 2015.
(Continued)

*Primary Examiner* — Alexander S Thomas
(74) *Attorney, Agent, or Firm* — Alston & Bird LLP

(57) ABSTRACT

Various embodiments are directed to an airline carpet kit comprising a plurality of carpet components collectively forming a substantially continuous floor covering, for example, for use within an aircraft interior. Each of the plurality of carpet components comprises a tufted carpet backing having a plurality of carpet tufts extending from a back surface of the carpet backing and above a top surface of the carpet backing; and an edge strip comprising an amorphous plastic material, wherein the edge strip extends around a lateral edge of the carpet backing between a base portion embedded within a back surface of the carpet backing and an edge surface defining a perimeter edge of the carpet component. The edge surface of a first carpet component abuts an edge surface of an adjacent second carpet component to form an at least substantially continuous floor covering for an aircraft interior.

17 Claims, 7 Drawing Sheets

(56) References Cited

PUBLICATIONS

Karastan, Carpet Sample Board Edging Topside, May 17, 2015.
Karastan, Carpet Sample Board Edging End Alternative, May 17, 2015.
Karastan, Carpet Sample Board Edging Back, May 17, 2015.

CARPET EDGING AND METHOD OF APPLYING THE SAME

CROSS-REFERENCE TO RELATED APPLICATIONS

This patent application claims priority from Provisional Appl. Ser. No. 62/338,367, filed May 18, 2016, which is incorporated herein by reference in its entirety.

BACKGROUND

Carpet products (e.g., broadloom carpet and/or modular carpet products such as carpet tile) comprise a backing (e.g., a woven backing and/or a nonwoven backing) having a plurality of tufts extending therethrough. Due to the construction of various carpet products, the edges of the carpet products can be subject to fraying after exposure to even minimal shear or other forces applied to a top surface of the carpet product.

Accordingly, in typical installations, such as in residential and in certain commercial applications, carpet products may be installed in areas such that the edges of the carpet products are not subject to extensive forces (e.g., by positioning the edges of carpet products adjacent walls, under protective panels (e.g., baseboards) and/or the like. Alternatively, the edges of adjacent carpet products may be secured relative to one another (e.g., by seaming two or more adjacent carpet products together), which helps to prevent fraying. For example, adjacent carpet products may be seamed together by taping or heat sealing two or more adjacent carpet products. The overall shape of the carpet product may be maintained by securing the carpet product to the floors, walls, and/or the like over which the carpet is installed (e.g., via one or more tack strips).

However, for certain carpet installations, such as those in aircraft or other vehicles, various restrictions may prevent, or make it difficult, to seam adjacent carpet products, and various carpet product edges may remain exposed. For example, in commercial passenger aircraft, carpet products may be placed around seat legs, around floor-level lighting (e.g., emergency lighting), and/or the like. Accordingly, the edges of such carpet products may remain exposed and subject to heavy amounts of force due to the heavy "foot traffic" of passengers walking across the surface of the carpet and any roll-aboard luggage. Moreover, weight restrictions, heat restrictions, and/or government regulations may prevent the use of seaming techniques to secure adjacent carpet components. Accordingly, the edges of the carpet products installed in aircraft may be exposed, and thus such carpet products may be subject to fraying after extended exposure to foot traffic throughout the aircraft.

The underlying floor structure of the aircraft is typically subject to some expansion and contraction during travel due to altitude and temperature changes and other forces experienced by the fuselage. Accordingly, carpet products secured directly to the floor structure of the aircraft (e.g., via double-sided tape) are subject to additional shear and tensile/compressive forces as the floor structure expands and contracts relative to the carpet product. Such continuous expansion and contraction may cause undesirable open joints to form between adjacent carpet products, and may cause the carpet product to compress and "buckle."

The edges of carpet products utilized in aircraft are thus often serged (e.g., by binding the edge of the carpet within a thread looped around the edge of the carpet) and/or taped (e.g., by sewing a fabric tape around the edge of the carpet product) to maintain the integrity of the edge of the carpet product. However, serged and/or taped edges may still be subject to fraying after continued exposure to shear forces, and visually highlight the presence of an edge or seam.

BRIEF SUMMARY

Certain embodiments are directed to aircraft carpet kits comprising a plurality of individual carpet components for placement within an aircraft. Each carpet component is configured to cover a portion of an aircraft interior floor and to abut adjacent carpet components such that, collectively, the carpet kits cover substantially all of an aircraft interior floor. The edges of each of the carpet components are bound within a hot-melt plastic that prevents undesirable fraying of the carpet component edging and forms a generally planar carpet component edge surface. The edge surface is configured to abut the edge surfaces of corresponding carpet components to form a substantially continuous floor covering.

Various embodiments are directed to an airline carpet kit comprising a plurality of carpet components collectively configured to form a substantially continuous floor covering within an aircraft. Each of the carpet components may comprise: a carpet backing having a plurality of carpet tufts extending therethrough, wherein each of the plurality of carpet tufts extends from a backside of the carpet backing and above an opposite topside of the carpet backing; an edge strip comprising an amorphous plastic material, wherein the edge strip extends around a lateral edge of the carpet backing between a base portion at least partially embedded within the backside of the carpet backing and an edge portion defining a perimeter edge of the carpet component; and wherein the perimeter edge of a first carpet component abuts a perimeter edge of an adjacent second carpet component to form an at least substantially continuous floor covering for an aircraft interior. The carpet backing and the carpet tufts may resist burning up to at least 1500 degrees Fahrenheit. Moreover, the edge portion of the edge strip may extend about the topside of the carpet backing.

Certain embodiments are directed to an airline carpet component comprising: a carpet backing having a plurality of carpet tufts extending therethrough, wherein the carpet backing and the plurality of carpet tufts resist burning up to at least 1500 degrees Fahrenheit and wherein each of the plurality of carpet tufts extends from a backside of the carpet backing and above an opposite topside of the carpet backing; and an edge strip comprising an amorphous plastic material, wherein the edge strip extends around a lateral edge of the carpet backing between a base portion at least partially embedded within the backside of the carpet backing and an edge portion defining a perimeter edge of the carpet component.

Moreover, various embodiments are directed to a method of manufacturing an airline carpet kit comprising: providing a plurality of airline carpet components collectively configured for carpeting the interior of an aircraft, wherein each of the plurality of airline carpet components comprises a tufted carpet backing having a lateral edge extending around the perimeter thereof, and having a plurality of carpet tufts extending through the carpet backing from a backside of the carpet backing and above an opposite topside of the carpet backing; filling an edge forming die with a melted amorphous plastic; pressing the edge forming die against at least a portion of the lateral edge of at least one of the plurality of airline carpet components such that the melted amorphous plastic contours around the lateral edge of the airline carpet component; and cooling the amorphous plastic material to form a solid edge strip around the lateral edge of the airline carpet component.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Various embodiments are directed to carpet products having an edge strip secured along edges of the carpet product to impede fraying of the edge of the carpet product, and to increase the dimensional stability of the carpet product. Moreover, various embodiments are directed to aircraft carpet kits comprising a plurality of carpet components having an edge strip secured along edges of the carpet product.

Figure 1:
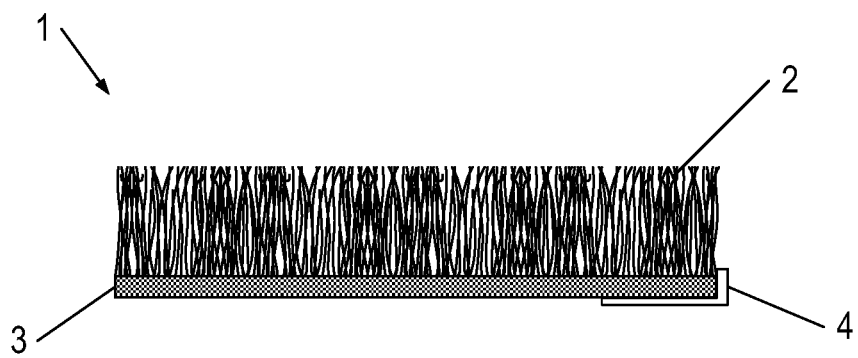
FIG. 1 is a schematic side view of a carpet product according to various embodiments.
Figure 2:
FIG. 2 is a schematic back view of a carpet product according to various embodiments.

FIGS. 1 and 2 are schematic diagrams illustrating a carpet product 1 having an edge strip 4 secured thereto. In various embodiments, the edge strip may comprise a plastic material having a low melting point. For example, the edge strip may comprise an amorphous polyolefin material. Any of a variety of hot melt materials may be utilized. For example, the hot melt material may comprise an Ethylene-vinyl acetate, a polyolefin, a polyamide, a polyester, and/or the like. As a specific example, the edge strip may comprise Reynco 54-117 hot melt, available in pelletized form from The Reynolds Company of Greenville, S.C. In various embodiments, the hot melt material may have a low melting point (e.g., less than 400 degrees Fahrenheit, less than 350 degrees Fahrenheit, and/or the like) such that the hot melt material is in a liquid form at 350 degrees Fahrenheit. In various embodiments, the hot melt may be transparent once cooled so the edge of seam of the carpet product is less visible. However, the hot melt may be translucent or opaque, and have any of a variety of colors to either match the carpet product, or provide an accent color that is more appealing to users and consumers.

Referring again to FIG. 1, the carpet product 1 may comprise a backing 3 and a plurality of tufts 2 extending through the backing 3. The edge strip 4 may be secured to a backside of the backing, and may extend beyond an edge of the backing 3. As discussed herein, at least a portion of the edge strip 4 may extend at least partially into the backing 3 (e.g., by material of the edge strip flowing between fibers of the backing 3 while the material is liquefied, and then cooling in place such that a portion of the edge strip is at least partially embedded within the backing) such that the edge strip 4 is secured relative to the carpet product 1. Moreover, the edge strip 4 may comprise a base portion adjacent the backside of the backing 3, and an edge portion extending beyond the edge of the backing and toward the topside of the carpet material. The base portion may extend along a backside of the carpet backing 3 and may be at least partially embedded within the carpet backing 3 (e.g., embedded between fibers of the carpet backing and/or the carpet tufts) while having an at least substantially planar base surface. In the illustrated embodiment, the edge portion extends away from the base portion (e.g., at least substantially perpendicular from the base portion) and around a lateral edge of the backing 3. Although not shown, in various embodiments, the edge strip 4 may additionally comprise a top portion extending away from the edge portion adjacent a topside of the carpet material (e.g., adjacent the backing 3) and at least substantially parallel to the base portion. In various embodiments, the base portion of the edge strip 4 may have a very small thickness, such that the thickness of the carpet product 1 is not substantially increased due to the presence of the edge strip 4.

Moreover, the edge portion may have an at least substantially flat exterior edge (e.g., facing away from the carpet product), thereby providing an at least substantially flat edge for the carpet product 1. The flat exterior edge may be at least substantially perpendicular to the base portion, such that the flat exterior edge may extend at least substantially vertically when the carpet product 1 is placed on a horizontal support surface. Accordingly, the flat exterior edge of adjacent carpet products 1 (e.g., adjacent carpet tiles) may be abutted in an installation to provide an at least substantially gapless joint therebetween such that no gaps exist between portions of the edges of the adjacent carpet products 1 as shown in the example of FIG. 8B discussed herein. In various embodiments, more than two carpet products 1 may be positioned adjacent one another, such that external corners of each of the plurality of carpet products 1 are adjacent to form an at least substantially gapless joint therebetween.

With reference to FIG. 2, which illustrates a back view of the carpet product 1, the base portion of the edge strip 4 may have a width extending inwardly and away from the edge of the carpet product 1. In various embodiments, the width of the base portion of the edge strip may be sufficiently wide to provide a substantially flat surface against which tape (or other fasteners, such as glue) may be secured (e.g., double-sided tape utilized to secure the carpet product 1 against a surface), for example, to connect adjacent carpet products 1. For example, the width of the base portion of the edge strip 4 may be at least approximately ½". However, the width of the base portion of the edge strip may be greater or less than ½" in various embodiments. As other non-limiting examples, the width of the base portion of the edge strip may be approximately ¼", 1", 2" and/or the like. The base portions of the edge strips 4 also provide a sufficiently broad flat surface to allow single-sided tape or adhesive-backed connectors to secure together adjoining carpet products in a "floating floor" arrangement wherein the carpet products are not secured to the floor at the seams.

Figure 3:
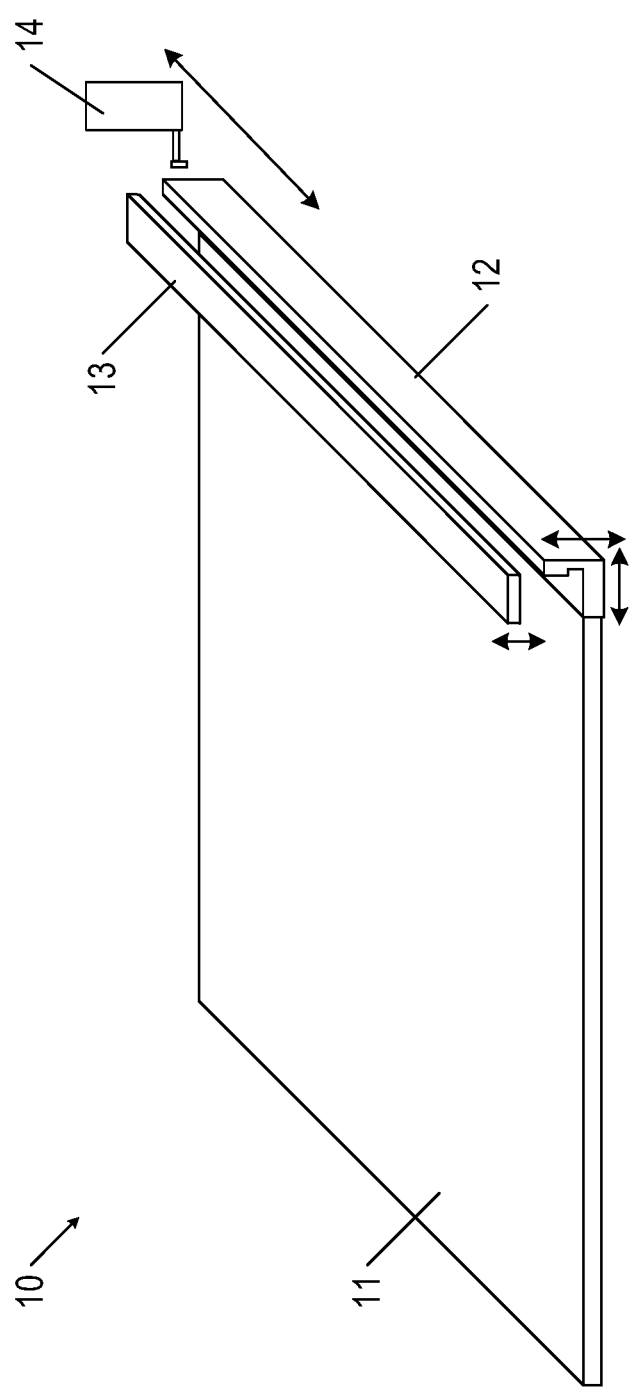
FIGS. 3-5 are schematic views of an edging apparatus according to various embodiments.
Figure 4:
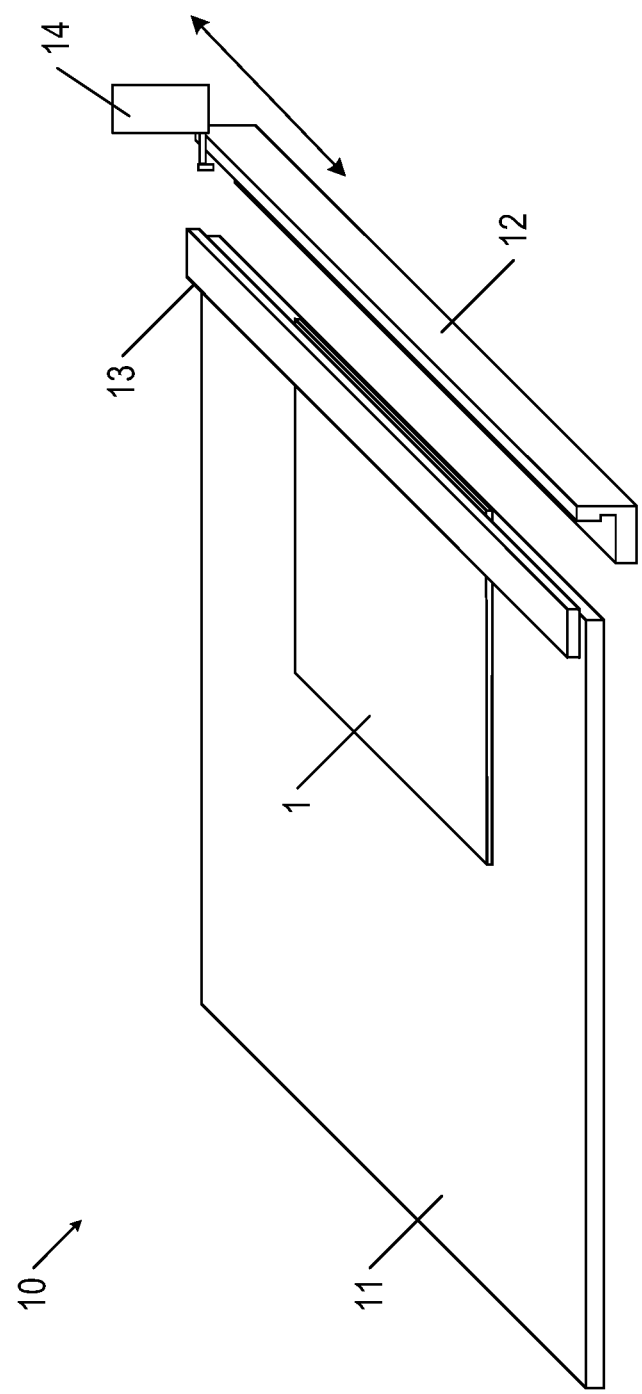
Figure 5:
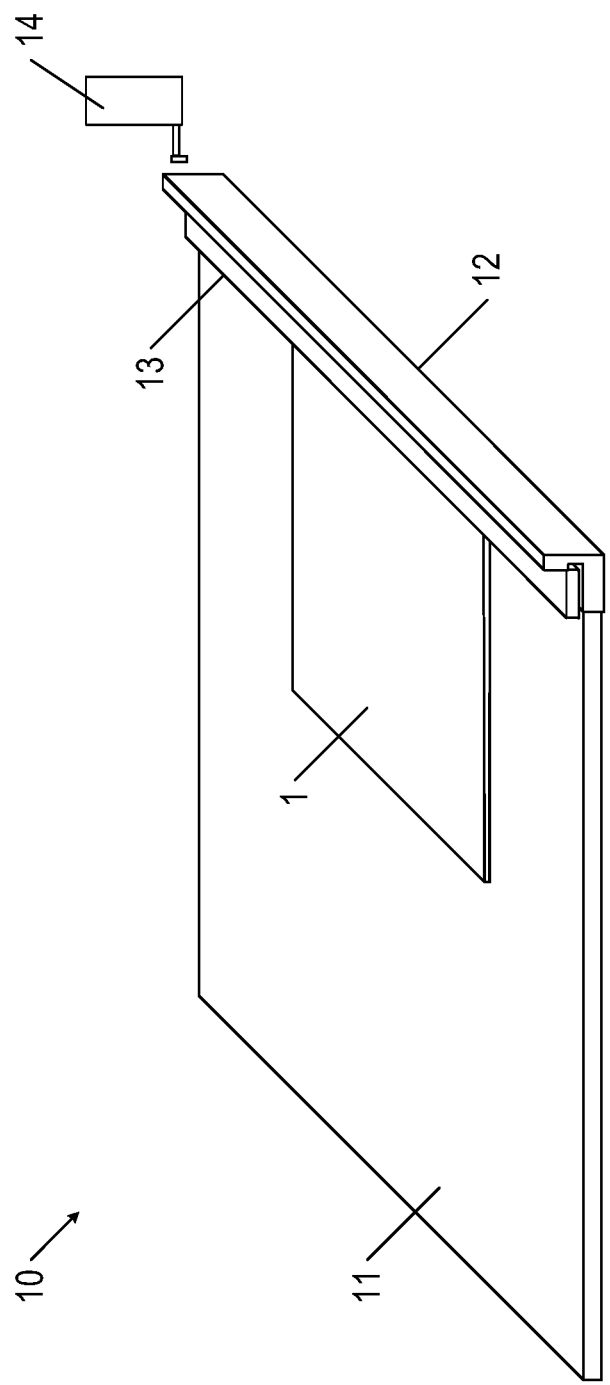

FIGS. 3-5 are schematic diagrams illustrating an edging apparatus 10 utilized to apply the edge strip 4 to a carpet product 1 according to one example embodiment. With reference first to FIG. 3, the edging apparatus 10 may comprise a support surface 11, an edge forming die 12, a clamp bar 13, and a dispenser 14. In various embodiments, the support surface 11 may comprise an at least substantially horizontal surface, a substantially horizontal conveying mechanism (e.g., one or more conveyor belts), and/or the like.

As illustrated in FIG. 3, the edge forming die 12 may have a horizontal applicator surface configured to be coplanar with the support surface 11 while in the application configuration. However, in various embodiments, the horizontal applicator surface may be above or below the support surface 11. The edge forming die 12 may be configured to move both vertically downward away from the application configuration (e.g., such that the horizontal applicator surface is below the support surface 11), and laterally away from the application configuration (e.g., away from the support surface) as explained below. Accordingly, the edge forming die 12 is configured to move between the application configuration (as shown in FIG. 3), and a material receiving configuration in which the horizontal support surface is below and/or away from the support surface 11 (as shown in FIG. 4). In the material receiving position, the edge forming die 12 may be positioned below or otherwise adjacent to a travel path of the dispenser 14, which is configured to move laterally across the width of the edge forming die 12 such that the dispenser 14 may apply edge strip material from a nozzle and along at least a portion of the length of the edge forming die 12. For example, the edge strip material may be applied to the edge forming die 12 via extrusion, spraying, pasting, and/or the like.

In various embodiments, the edge forming die 12 may comprise an aluminum and/or steel material having a non-stick coating (e.g., a nickel coating) such that the edge strip material is prevented from adhering to the edge forming die 12 while the edge strip material cures to form the edge strip 4 during the application process, although however, other materials could be used for the edge forming die 12. As illustrated in FIG. 3, the edge forming die 12 may define a notch within a vertical support surface of the edge forming die 12. The notch may be sized such that the notch is larger than the thickness of the backing 3 of the carpet product 1, such that the backing 3 may be positioned within the notch during the application process. As will be described herein, the notch may be configured to provide a maximum height of the flat edge portion of the edge strip 4.

Although not shown, the edge forming die 12 may be associated with a cooling mechanism configured to cool the edge forming die 12 to decrease the amount of time necessary to cure the edge strip 4. In various embodiments, the edge forming die 12 may comprise a cooling channel along a base portion of the edge forming die 12. The cooling channel may be configured to accept a cooling fluid (e.g., air, water, and/or the like) running along the cooling channel to cool the edge forming die 12 while the edge strip material cures against the carpet product 1. For example, the cooling channel may be configured to receive cooling air supplied by a vortex chiller.

In various embodiments, the edge forming die 12 may be at least approximately 6 feet wide, and accordingly the support surface 11 and the clamp bar 13 may have a corresponding width such that the carpet product 1 may be secured therein. However, any of a variety of widths may be utilized such as the non-limiting examples of a 15-feet wide edge forming die 12, clamp bar 13, and support surface 11; a 30-feet wide edge forming die 12, clamp bar 13, and support surface 11; and/or the like.

The clamp bar 13 is configured to move vertically between an open configuration (e.g., as shown in FIG. 3), and a clamped configuration (as shown in FIG. 4), in which the clamp bar 13 clamps a carpet product 1 against the support surface 11 and the horizontal applicator surface of the edge forming die 12. The clamp bar may comprise an aluminum material, however any of a variety of materials may be utilized (e.g., steel, plastic, and/or the like).

In various embodiments, each of the edge forming bar 12 and the clamp bar 13 may be movable via one or more linear actuators (e.g., pneumatic actuators, hydraulic actuators, and/or the like).

The dispenser 14 may comprise a nozzle through which liquid edge strip material is applied onto the horizontal support surface of the edge forming bar 12. For example, the nozzle may have a 0.19" diameter round application port through which the edge strip material is applied in liquid form onto the horizontal support surface of the edge forming bar 12. However, any of a variety of shapes and/or size extrusion ports may be utilized, including ¼" diameter round application port, a rectangular application port, an oblong application port, and/or the like. In various embodiments, the dispenser 14 may be connected with an edge strip material supply, such as a heating pot configured to maintain the edge strip material supply in a liquid form. For example, the edge strip material supply may be configured to maintain the edge strip material at 350 degrees Fahrenheit.

The dispenser 14 may comprise one or more sensors configured to detect the positioning of the carpet product 1 placed within the edging apparatus 10. For example, the dispenser 14 may comprise one or more optical sensors configured to detect lateral edges of the carpet product 1 placed within the edging apparatus 10. Accordingly, the dispenser 14 may be positioned to apply edge strip material along the horizontal application surface of the edge forming die 12 at a position such that the resulting edge strip 4 does not extend substantially beyond the lateral edges of the carpet product 1.

In various embodiments, the edging apparatus 10 may comprise a plurality of dispensers 14. For example, a first dispenser 14 may be configured to apply edge strip material along a first portion of the length of the edge forming die 12, and a second dispenser 14 may be configured to apply edge strip material along a second portion of the edge forming die 12. Accordingly, particularly for long edge forming dies 12 in which the amount of time elapsed for the dispenser 14 to apply edge strip material along the length of the edge forming die 12 is sufficiently long that a portion of the edge strip material begins to cure before the edge forming die 12 is moved to the application configuration, two or more dispensers 14 may be provided to apply edge strip material to a portion of the edge forming die 12. Moreover, in various embodiments, the edge forming die 12 may be heated in order to slow the amount of time to cure the edge strip material. In such embodiments, the edge forming die 12 may be subsequently cooled to cure the edge strip material to form the edge strip 4 once the edge forming die 12 is in the application position.

Although not shown in FIGS. 3-5, the edging apparatus 10 may additionally comprise one or more edge trimmers configured to trim any excess edge strip 4 extending beyond the lateral edges of the carpet product 1. For example, the edging apparatus 10 may comprise one or more cutting blades (e.g., pneumatically actuated cutting blades) configured to trim the excess edge strip 4 extending beyond the lateral edges of the carpet product 1 and provide a sharp, clean edge. In various embodiments, the edge trimmers may be configured to move laterally across the width of the edge forming die 12, such that the edge trimmers align with the edges of the carpet product 1 in order to trim the excess edge strip 4 extending beyond the lateral edges of the carpet product 1. The edge trimmers may additionally comprise one or more sensors configured to locate the lateral edges of the carpet product 1. For example, the edge trimmers may comprise one or more optical sensors configured to detect the location of the lateral edges of the carpet product 1.

Figure 6:
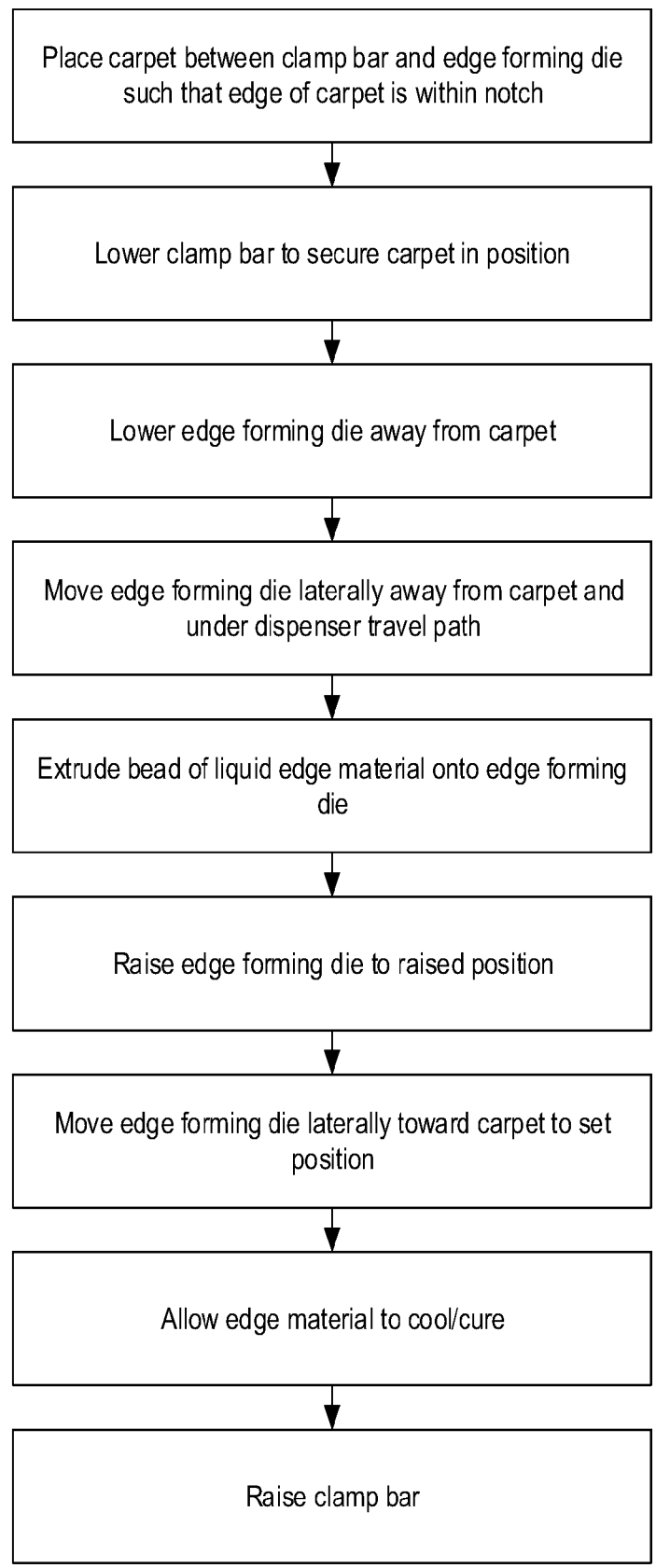
FIG. 6 is a flowchart illustrating steps for providing an edge for a carpet product according to various embodiments.

FIG. 6 is a flowchart illustrating various steps in applying the edge strip material to form an edge strip 4 along an edge of a carpet product 1. As shown in FIG. 6, a carpet product 1 is positioned within the edging apparatus 1 such that the carpet product 1 is between the raised clamping bar 13 and the co-planar support surface 11 and horizontal applicator surface of the edge forming die 12 (in the configuration shown in FIG. 3). The carpet product 1 is positioned such that an edge of the carpet product 1 is placed against or adjacent to a vertical surface of the notch of the edge forming die 12, such that the edge to be sealed can be positioned within the notch of the edge forming bar 12. The clamping bar 13 is then lowered to secure the carpet product 1 in place. The edge forming die 12 is then lowered and/or moved laterally away from the support surface 11 such that the edge forming die 12 is positioned under the travel path of the dispenser 14 (e.g., as shown in FIG. 4).

Once the edge forming die 12 is positioned below the travel path of the dispenser 14, the dispenser 14 moves laterally across the width of the edge forming die 12, detects the position of the carpet product 1 (e.g., the lateral position of the carpet product 1 within the edging apparatus 10), and applies liquefied edge strip material onto the horizontal applicator surface of the edge forming die 12, proximate the notch of the edge forming die 12.

Once the bead of liquefied edge strip material is applied to the edge forming die 12 and the dispenser 14 is moved clear of the travel path of the edge forming die 12 (e.g., the travel path between the application configuration and the material receiving configuration), the edge forming die 12 is raised such that the horizontal applicator surface is adjacent the support surface 11, and the edge forming die 12 is moved laterally toward the support surface 11 to an application configuration (as shown in FIG. 5). By moving the edge forming die 12 laterally toward the application configuration, the edge strip material is smoothed against the backside of the carpet product 1 while permitting a portion of the edge strip material to penetrate into the backing 3 of the carpet product 1. Excess edge strip material that does not penetrate into the backing 3 is squeezed or directed toward the edge of the carpet product 1 and into the notch of the edge forming die 12. The edge strip material is directed into the notch, and around the edge of the carpet product 1. Thus, the edge strip material forms an edge strip 4 defining an edge that can extend above the backing 3 of the carpet product 1. The edge strip 4 may extend to the top of the notch, where it forms a substantially flat top surface of the edge strip 4. Thus, the edge strip 4 forms a substantially flat edge of the carpet product 1 with a substantially flat top surface (e.g., as shown in FIG. 1). In various embodiments, a portion of the edge strip 4 extends over a topside of the backing 3, thereby forming a "C"-shape around the edge of the backing.

Although the described process is illustrated and described with reference to an at least substantially linear edge of a carpet product 1, the described process may be configured apply edge strip 4 to any of a variety of edge shapes (e.g., curves, interior corners, exterior corners, and/or the like). In such embodiments, the edge forming die 12 may have a shape corresponding to the desired shape of the edge to be applied to the carpet product 1. For example, the edge forming die 12 may have a curved shape in order to provide a curved edge of a carpet product 1, an interior corner shape in order to provide an interior corner shaped edge of a carpet product 1, an exterior corner shape in order to provide an exterior corner shaped edge of a carpet product 1, and/or the like. In addition, a number of edge forming dies may be placed adjacent to each other, such as to create a corner shape from two straight edge forming dies.

Once the edge forming die 12 is positioned in the application configuration, the edge strip material cures while the edge forming die 12 remains in the application configuration. As described herein, the edge forming die 12 may comprise an integrated cooling mechanism, and accordingly the cooling mechanism may be configured to cool the edge forming die 12 and the edge strip material positioned on the edge forming die 12 to form the edge strip 4. Once the edge strip material cures, the clamp bar 13 is raised, such that the carpet product 1 may be removed from the edging apparatus 10. Moreover, in various embodiments, after the edge strip material cures, portions of the edge strip 4 extending beyond the lateral edges of the carpet product 1 may be trimmed (e.g., automatically and/or manually).

In various embodiments, the process described herein and illustrated in FIG. 6 may be repeated for each edge of the carpet product 1 for which an edge strip 4 is to be applied. Accordingly, after the edge strip material cures, the carpet product 1 may be turned and reinserted into the edging apparatus 10 such that a subsequent edge may be formed with an edge strip 4.

Elongated carpet product 1 edges having a length longer than the width of the edge forming die 12 may be formed in a plurality of parts. For example, a first portion of the edge of the elongated carpet product 1 may be formed according to the method described herein. The elongated carpet product 1 may then be moved laterally to form an edge along a second portion of the same edge of the elongated carpet product 1. In such embodiments, at least a portion of the elongated carpet product 1 may extend beyond the width of the edge forming die 12.

In various embodiments, the above described process may be provided to form one or more carpet products 1 to be utilized to carpet the interior of an aircraft as a portion of an aircraft carpet kit 100, as discussed herein. For example, a first carpet product 1 may be provided having a shape configured to be positioned within an aisle of a commercial aircraft, between two or more floor lighting strips secured to a floor of an aircraft. In such an example, the edges of the carpet product 1 configured to be adjacent side edges of the floor lighting strips may comprise edge strip 4 forming an edge of the carpet product 1 as described herein. As yet another example, edges of adjacent carpet products 1 to be positioned within the aircraft adjoin the aisles (such is in the footwells between seats) may each comprise edge strip 4 forming an edge of the carpet product 1 as described herein. In such embodiments, the adjacent carpet products 1 may be secured to the floor of the aircraft via one or more fasteners, such as double-sided tape. Moreover, in various embodiments, the adjacent carpet products 1 may be secured relative to one another via single- or double-sided tape secured to the edge strip 4 positioned along the backside of the respective carpet products 1. As yet another embodiment, carpet products 1 may be formed to be fit around various components of an aircraft interior, such as seat securing points, and may comprise edges along the portion of the carpet products 1 adjacent the various components of the aircraft interior.

Figure 7:
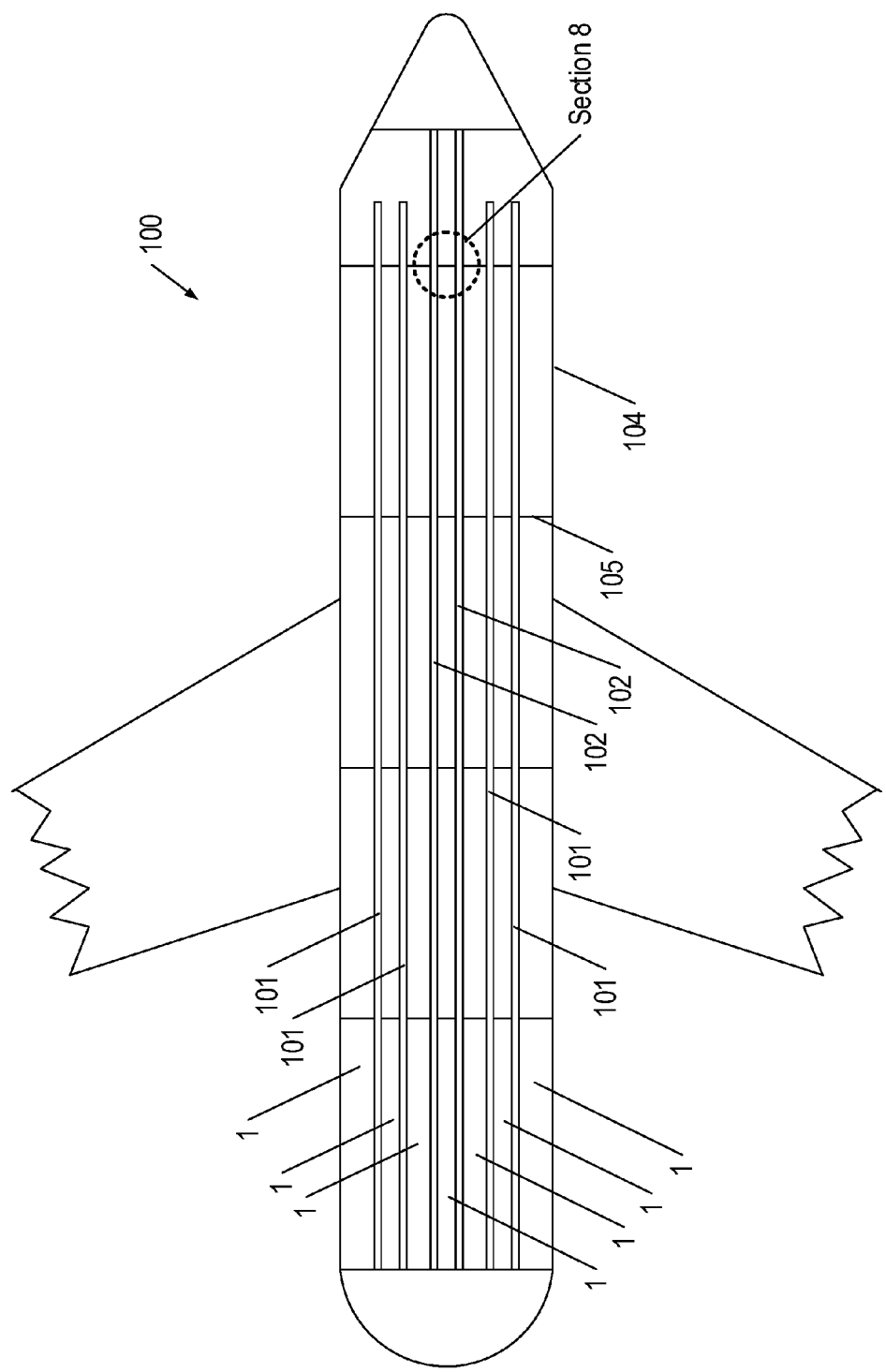
FIG. 7 is a schematic overhead view of an example airline carpet kit.

Moreover, various embodiments are directed to an aircraft carpet kit comprising a plurality of carpet products 1 having an edge formed by an edge strip 4 as described herein. The aircraft carpet kit may comprise a plurality of carpet components 1 configured to fit between various components of the interior of the aircraft to substantially cover at least a portion of the floor of the aircraft. In various embodiments, the aircraft manufacturer, owner, and/or operator may provide specifications regarding the size, shape, quantity, and/or the like of each carpet component 1 to be included in the carpet kit. Various carpet components 1 may be manufactured in accordance with the provided specifications, for example, by cutting (e.g., via a blade, a laser, a water jet, and/or the like) each carpet component 1 from a broadloom carpet product. The edges of each carpet component 1 may be provided with an edge strip 4 in accordance with the process described herein. FIG. 7 illustrates an example layout of an aircraft carpet kit 100 comprising a plurality of carpet components 1. The plurality of carpet components 1 may be configured to fit between obstructions along a floor surface 103 (shown in FIGS. 8A-8B) of an aircraft interior. For example, the plurality of carpet components 1 may be configured to fit between seat tracks 101 configured for securing aircraft seats within the aircraft interior, floor lighting strips 102, side edges of a floor surface 103, an aircraft fuselage 104, and/or the like. Moreover, as shown in FIG. 7, a plurality of carpet components 1 may abut one another at joints 105, for example, to cover an elongated portion of an aircraft floor surface 103.

Figure 8A:
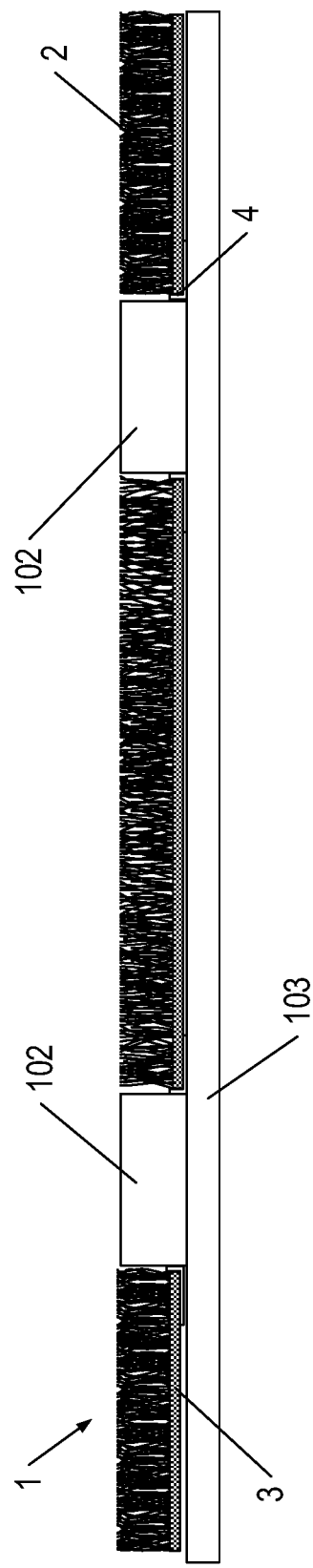
FIGS. 8A-8B are schematic sectional views of a portion of the example airline carpet kit illustrated in FIG. 7.
Figure 8B:
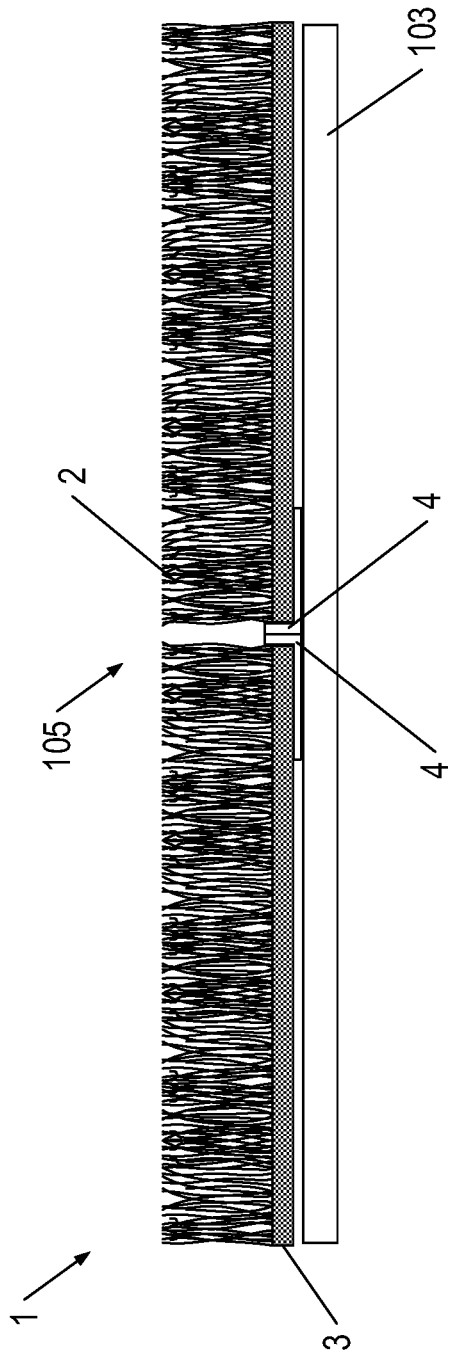

FIGS. 8A and 8B provide side-sectional views of the aircraft floor surface 103 shown in Section 8 of FIG. 7. Specifically, FIG. 8A is a side-sectional view of the portion of the aircraft floor surface shown in Section 8, perpendicular to the direction of the floor lighting strips 102. As shown in FIG. 8A, the carpet components 1 may be secured to an aircraft floor surface 103 adjacent the floor lighting strips 102 (e.g., via double-sided tape and/or another fastener) such that the flat exterior edge of an edge strip 4 is adjacent a side edge of floor lighting strip 102.

Moreover, as shown in FIG. 8B, which is a side-sectional view of the portion of the aircraft floor surface shown in Section 8, parallel to the direction of the floor lighting strips 102. As shown in Section 8, two or more carpet components 1 may be adjacent one another at a joint 105, such that the flat exterior edge of edge strips 4 of the carpet components 1 are adjacent, as discussed herein.

Accordingly, for elongated carpet products 1 utilized to carpet at least a portion of the interior of the aircraft (e.g., an elongated carpet product 1 configured to carpet an aisle of a commercial passenger aircraft), edge strip material may be applied to the elongated edges of the carpet component 1 via one or more methods as described herein. For example, the edge strip 4 may be secured along the edge of the elongated carpet component in a single iteration (e.g., utilizing an edge forming die 12 at least as wide as the length of the elongated carpet product 1) and/or in a plurality of iterations (e.g., forming an edge along a first portion of the elongated carpet component 1, then forming an edge along a second portion of the elongated carpet component). In embodiments in which the edge is formed in a single iteration, the edging apparatus 10 may comprise a plurality of dispensers in order to apply edge strip 4 onto the edge forming die 12 such that the edge strip material does not cure before the edge forming die 12 is moved to the application configuration. As yet another example, a single dispenser 14 may be provided that is configured to move laterally across the width of the edge forming die 12 sufficiently quickly to complete the extrusion process before the edge strip material cures. As yet another example, the edge forming die 12 may be heated to slow the curing time for the edge strip material such that the dispenser 14 may complete applying the edge strip material onto the edge forming die 12 before a portion of the edge strip material cures.

In various embodiments, the carpet products 1 of the aircraft carpet kit may comprise a backing 3 and tufts 2 complying with applicable regulations regarding carpet materials that may be utilized in aircraft. For example, the carpet products 1 may be configured to resist burning at high temperatures (e.g., at or above 1500 degrees Fahrenheit). In various embodiments, the backing 3 and/or the tufts 2 may comprise a nylon material and/or a wool material.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of this disclosure. Although specific terms are employed herein, they are used in a generic and descriptive sense only and not for purposes of limitation.

For example, in various embodiments, an edge strip 4 may comprise a pre-formed, solid edge strip 4 that may be secured relative to a carpet component 1. For example, a pre-formed, solid edge strip 4 may be placed adjacent an edge of a carpet component 1 and heated until at least partially liquefied, such that the material of the edge strip 4 may be secured relative to the carpet component. As just one example embodiment, the pre-formed solid edge strip 4 may be placed onto an edge forming die 12 and heated in place. The edge forming die 12 may then be directed against an edge of a carpet component 1, as discussed in detail herein to form an edge strip 4 secured with the carpet component 1.

As yet another embodiment, the edge strip 4 may comprise a pre-formed, solid edge strip 4 that may be secured relative to a carpet component 1 via one or more fasteners (e.g., double-sided tape, glue, and/or the like).

That which is claimed:

1. An airline carpet kit comprising a plurality of carpet components collectively configured to form a substantially continuous floor covering within an aircraft,
   wherein each of the plurality of carpet components comprise:
      a carpet backing having a plurality of carpet tufts extending therethrough, wherein each of the plurality of carpet tufts extends from a backside of the carpet backing and above an opposite topside of the carpet backing;
      an edge strip comprising an amorphous plastic material, wherein the edge strip extends around a lateral edge of the carpet backing between a base portion at least partially embedded within the backside of the carpet backing and an edge portion defining a perimeter edge of the carpet component; and
   wherein the perimeter edge of a first carpet component abuts a perimeter edge of an adjacent second carpet component to form an at least substantially continuous floor covering for an aircraft interior.

2. The airline carpet kit of claim 1, wherein the carpet backing and the carpet tufts resist burning up to at least 1500 degrees Fahrenheit.

3. The airline carpet kit of claim 1, wherein the amorphous plastic material comprises an amorphous polyolefin.

4. The airline carpet kit of claim 1, wherein the amorphous plastic material has a melting point below 350 degrees Fahrenheit.

5. The airline carpet kit of claim 1, wherein the edge portion of the edge strip extends above the topside of the carpet backing.

6. The airline carpet kit of claim 1, wherein the base portion of the edge strip extends from the lateral edge of the carpet backing toward a central portion of the carpet backing.

7. The airline carpet kit of claim 6, wherein the edge portions extends at least substantially perpendicularly away from the base portion.

8. The airline carpet kit of claim 7, wherein the edge portion extends around the lateral edge of the carpet backing such that a portion of the edge surface is disposed on the topside of the carpet backing.

9. The airline carpet kit of claim 1, wherein the lateral edge of the carpet backing defines an interior corner having a first edge portion and a second edge portion, and wherein the edge strip extends along the first edge portion and the second edge portion.

10. The airline carpet kit of claim 1, wherein the amorphous plastic material comprises at least one of: ethylene vinyl acetate, polyolefin, polyamide and polyester.

11. The airline carpet kit of claim 1, wherein the amorphous plastic material has a melting point less than 400° F.

12. The airline carpet kit of claim 1, wherein the edge strip is at least substantially transparent.

13. The airline carpet kit of claim 1, wherein the edge strip is translucent or opaque.

14. The airline carpet kit of claim 1, wherein the edge strip further defines a top portion extending away from the edge portion of the edge strip and adjacent the topside of the of the carpet backing, wherein the top portion extends at least substantially parallel with the base portion of the edge strip.

15. The airline carpet kit of claim 1, wherein the edge portion of the edge strip defines a flat exterior edge.

16. The airline carpet kit of claim 15, wherein the flat exterior edge is at least substantially perpendicular to the base portion of the edge strip.

17. The airline carpet kit of claim 1, wherein each of the plurality of carpet tufts comprise one of: nylon or wool.

* * * * *